Sept. 9, 1958   H. FLEISCHER ET AL   2,851,060
FLUID FLOW CONTROL FITTING
Filed Feb. 23, 1955

INVENTORS.
HENRY FLEISCHER
JACK ROGG
BY
ATTORNEY

United States Patent Office 2,851,060
Patented Sept. 9, 1958

2,851,060

FLUID FLOW CONTROL FITTING

Henry Fleischer, Jamaica, and Jack Rogg, Long Island City, N. Y.

Application February 23, 1955, Serial No. 490,092

3 Claims. (Cl. 138—46)

This invention relates to the art of fluid flow control devices and particularly concerns a fitting for controlling the flow of a fluid in a conduit.

It is a principal object of the invention to provide a device for maintaining the volume rate of fluid flow in a conduit substantially constant as the pressure varies.

It is a further object to provide a fitting for connecting two sections of a conduit in which a fitting is disposed, a flexible member whose configuration changes as the pressure of fluid flowing in the conduit changes to maintain the volume rate of flow substantially constant between predetermined limits.

It is a further object to provide a flexible member for fluid flow control which coacts with an adjacent flow chamber to maintain the volume rate of fluid flow substantially constant as the fluid pressure changes between predetermined limits.

A further object of the invention is to provide a fitting of the character described which is simple in construction and inexpensive to manufacture.

A further object is to provide a fluid flow control member of the character described which is in the form of an insert in a conduit coupling member.

Other and further objects and advantages of the invention will become apparent from the following description taken together with the drawing wherein.

Figure 1:
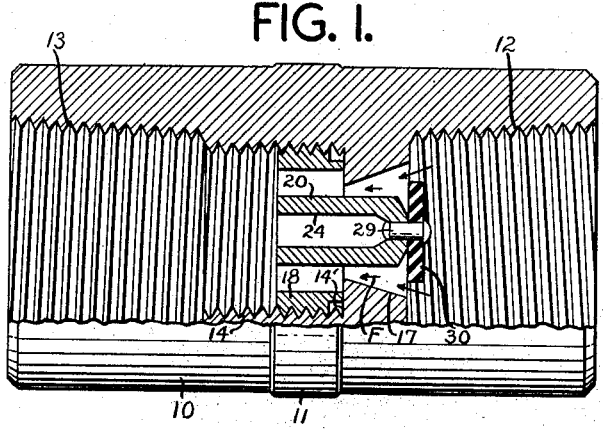
Fig. 1 is a partial sectional view of a fitting embodying the invention.
Figure 2:
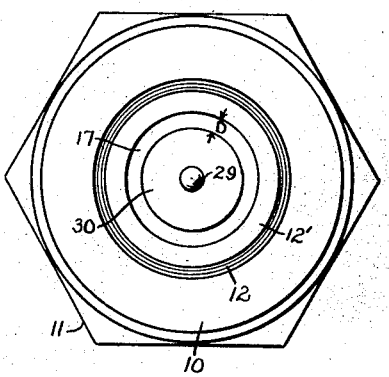
Fig. 2 is an end view of the fitting.
Figure 3:
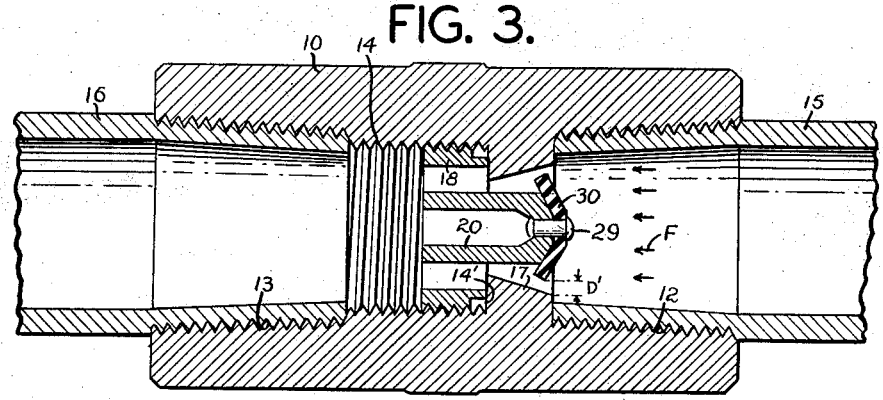
Fig. 3 is a sectional view showing the fitting with inlet and outlet conduit sections coupled thereto and illustrating the operation of the fluid flow control member.
Figure 4:
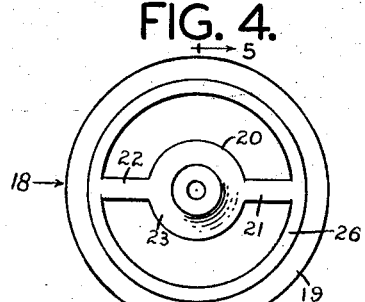
Fig. 4 is an end view of an insert element forming part of the invention.
Figure 5:
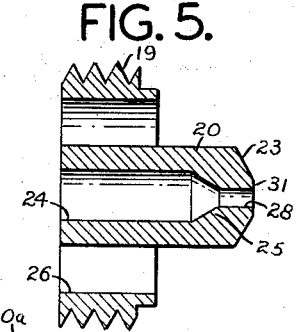
Fig. 5 is a sectional view taken on lines 5—5 of Fig. 4.

In Figs. 1, 2 and 3 is shown a hollow cylindrical coupling member 10 having a central hexagonal outer section 11 adapted for application of a parallel jawed wrench. The member has centrally disposed internally threaded bores 12 and 13 at its both ends. A further threaded central bore 14 of lesser diameter than bore 13 continues from the end of bore 13 to the end of the central section 11. Both bores 12 and 13 are inwardly tapered somewhat for effective gripping of the threaded ends of an inlet conduit 15 and an outlet conduit 16. Between the adjacent end faces 12' and 14' of bores 12 and 14 is a conical central bore 17 having a smooth wall. The narrower end of the bore 17 being at face 14' and the wider end of the bore being at face 12'. Threaded in bore 14 is an insert 18 more clearly shown in part in Figs. 4 and 5. The insert has an externally threaded cylindrical section or ring 19 whose thread matches that of bore 14. A cylindrical nipple 20 is supported by webs 21 and 22 on the inner wall or passage 26 of section 19.

The nipple 20 extends beyond section 19 substantially the full axial extent of bore 17 and terminates in a conical seat 23. The cylindrical bore 24 has a tapered section 25 which terminates in a narrow bore 28 which is adapted to secure a rivet or screw 29. The rivet 29 secures a flexible disc or washer 30 on the flat annular section 31 at the end of the nipple 20. Disc 30 is made of a moderately flexible material such as rubber or a plastic elastomer.

Figure 6:
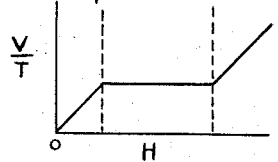
Fig. 6 is a chart useful in explaining the mode of operation of the invention.

When the inlet pipe section 15 and outlet pipe section 16 are coupled to the member 10, with insert 20 properly inserted in bore 14 to seat on the end face 14' of the bore, the fitting is ready for use. A fluid, either a liquid or gas, will flow in the direction of the arrows F shown in Figs. 1 and 2. Fig. 6 shows that the volume V of fluid which flows per unit time T increases as the fluid head or pressure H increases steadily up to a predetermined pressure P. This indicates as shown in Fig. 1 that the disc 30 is not flexed and the fluid flows past the disc through conical bore 17, bore 26, and bore 14 to outlet conduit 16. As the pressure H increases the initial width D of the annular space between disc 30 and bore 17 decreases because the disc flexes. This flexure or bending of the disc continues until the minimum width D' of the space between disc 30 and bore 17 is obtained at pressure P' when the inner side of the disc 30 seats on the tapered annular section 23 at the end of the nipple. Beyond pressure P' the rate of flow of fluid will increase because the disc 30 cannot further increase the construction of bore 17. Between pressures P and P' the coaction of disc 30 with bore 17 thus maintains the volume rate of fluid flow constant.

In the event of wear of disc 30 it may readily be replaced by removing insert 18. All parts of the fitting use standard size threads. The several threaded parts may be formed by mass production methods of brass, bronze and the like. Nipple 20 may be integrally formed with section 19 or may be welded into place therein.

Figure 7:
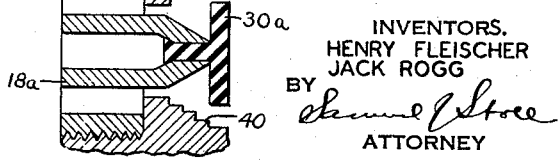
Fig. 7 shows a modified form of flexible disc and fitting embodying the invention.

Fig. 7 shows a modified form of disc 30a which has an integrally formed flexible neck replacing the rivet 29. The disc is disposed in contact with the flat annular face at the end of the nipple 18a by forcing the neck of the disc 30a through bore 28. The coupling member 10a has a tapered bore with a stepped wall 40 instead of the smooth faced bore 17 shown in Fig. 3. For certain fluids the stepped form of bore may result in better control of fluid flow than the smooth bore 17.

The invention is intended primarily for use as a unidirectional flow controlling device between predetermined flow pressure limits. Such a device is particularly useful in refrigeration and air conditioning systems where the rate of fluid flow must remain constant as the fluid pressure increases. It may also be used for controlling flow of lubricating oil in an engine and in many other applications.

Although a single embodiment of the invention has been disclosed it will be apparent to those skilled in the art that many changes are possible without departing from the scope of the invention as defined in the appended claims.

What is claimed and desired to protect by Letters Patent of the United States is:

1. A fluid flow control fitting comprising a cylindrical member having a central bore formed therethrough, said bore having a plurality of sections, the outer two of said sections being internally threaded for receiving and holding a pair of threaded conduits, an inner section having a conically tapered wall, a second inner section disposed between one of said outer sections and said conically tapered inner section, said second inner section being internally threaded, a tubular insert threaded into said second inner section, a cylindrical nipple disposed within said tubular insert and having one end projecting into said conically tapered inner section, the outer diameter of said cylindrical nipple being sufficiently smaller than the inside diameter of said tubular insert and said conically tapered inner section to provide a passage for fluid between said tubular insert and conically tapered inner section on the one hand and the cylindrical nipple on the other hand, radial supports being provided between the tubular insert and the cylindrical nipple to support said cylindrical nipple in place in said tubular insert, the end of the cylindrical nipple which projects into the conically tapered inner section having an outer conical portion which is concentric therewith and a central portion within said outer conical portion, and a flexible disc which is centrally attached to said central portion of the nipple, said disc extending radially beyond the periphery of said cylindrical nipple but spaced radially from said conically tapered inner section, said disc being adapted to flex under fluid pressure to seat itself on said conical portion of the nipple, thereby changing the spacing between the peripheral edge of the disc and said conically tapered inner section to modify the flow therebetween.

2. A fitting in accordance with claim 1, wherein the conically tapered wall is smooth.

3. A fitting in accordance with claim 1, wherein the conically tapered wall is stepped.

References Cited in the file of this patent

UNITED STATES PATENTS

| | | |
|---|---|---|
| 2,444,677 | Rosenblum | July 6, 1948 |
| 2,454,929 | Kempton | Nov. 30, 1948 |
| 2,489,932 | Rosenblum | Nov. 29, 1949 |
| 2,554,790 | Miller | May 29, 1951 |